…

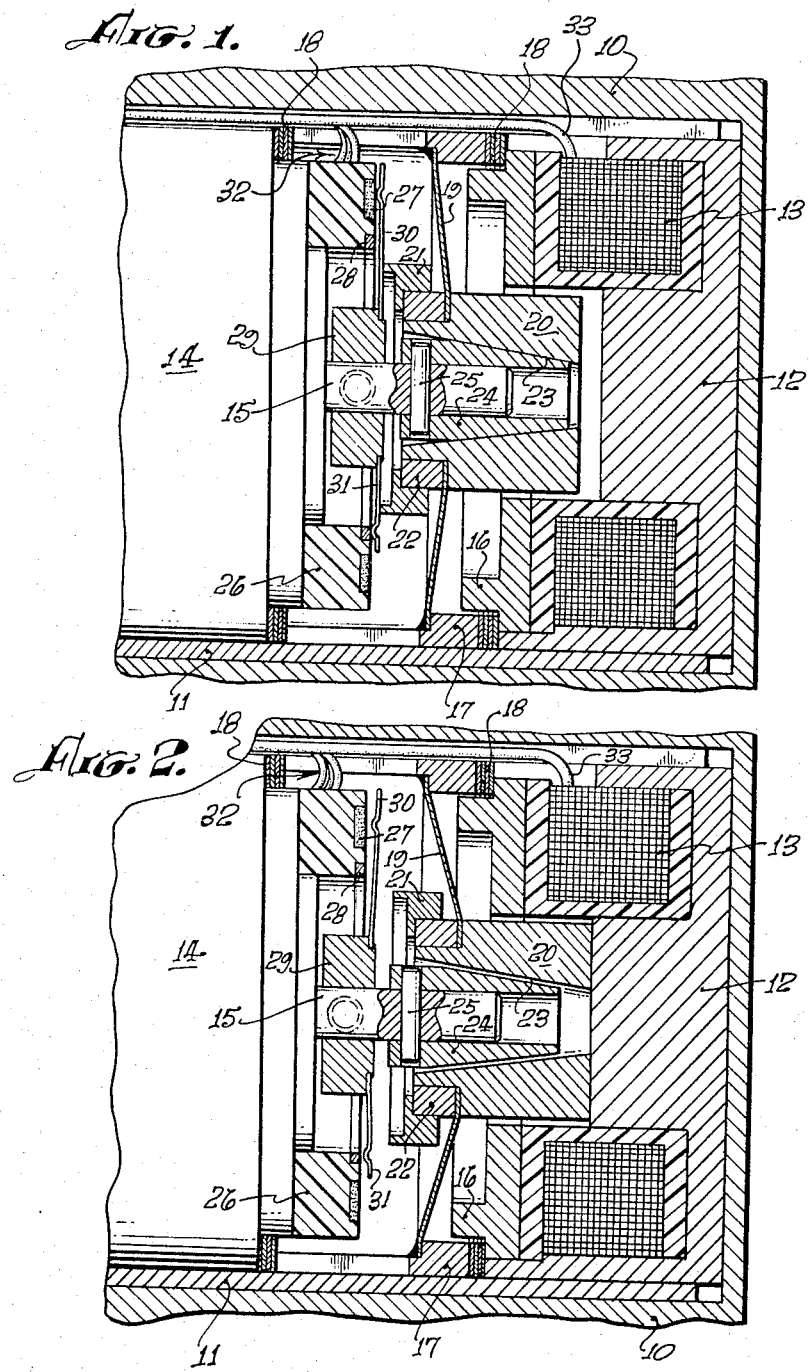

United States Patent Office 3,360,756
Patented Dec. 26, 1967

3,360,756
POTENTIOMETER WITH LIFT-OFF WIPER
Reginald Darley, Santa Ana, and Peter A. Barrett, Pomona, Calif., assignors to General Dynamics Corporation, a corporation of Delaware
Filed Feb. 27, 1967, Ser. No. 618,660
8 Claims. (Cl. 338—116)

ABSTRACT OF THE DISCLOSURE

The disclosure is directed to a magnetically operated device for lifting the wiper from a potentiometric resistor element when output voltages are not required, such as when the wiper element is moved relative to the resistor element, thereby reducing frictional effects during such motion. More specifically, the wiper is connected to a synchro rotor shaft and is actuated upon movement of a solenoid plunger. A diaphragm spring is employed to effect a circuit connection between the potentiometer pick-off points and the wiper when the solenoid windings are de-energized. Energization of the windings is effective to overcome the diaphragm spring bias force to remove positive pressure between the wiper and pick-off points, thereby allowing the synchro shaft to rotate the wiper to further pick-off positions without frictional effects.

Background of the invention

This invention relates to means for extending the life and improving the performance of instruments of the type employing variable resistance, and more particularly to a device for lifting the wiper arm off the resistance element during certain operational conditions.

In such instruments, any abnormal movement of the brush tends to produce excessive wear, leading to erratic behavior or actual breakdown of the instrument. Such abnormal movement of the brush may cause serious difficulty in instruments that are particularly sensitive to vibration. U.S. Patent 2,640,900 is exemplary of prior art attempts to solve this problem.

Summary of the invention

This invention provides a means to lift the potentiometer wiper when output voltages are not required, thereby eliminating the degrading effects of wiper friction and element wear inherent with measuring techniques using potentiometers.

Therefore, it is an object of this invention to provide a potentiometer with a lift-off wiper arrangement.

A further object of the invention is to provide a means for substantially reducing the surface wear of resistive elements when the instrument in which they are located is not in use.

Another object of the invention is to provide a means for lifting the wiper arm off the resistive elements of a potentiometer when output voltages are not required.

Another object of the invention is to lift the potentiometer wiper when output voltages are not required, thereby eliminating the degrading effects of wiper friction and element wear inherent with measuring techniques using potentiometers.

Other objects of the invention will become readily apparent in view of the following description and accompanying drawings wherein:

Brief description of drawings

FIG. 1 is a view, partially in cross-section, of an embodiment of the invention with the wiper arm in operative position; and FIG. 2 is a partial cross-sectional view of the FIG. 1 device with the wiper arm in the inoperative position.

Description of the embodiment

The device illustrated in the drawings generally comprises a housing 10 within which is located a sleeve 11, a solenoid casing 12 within which is retained a solenoid coil assembly 13, a synchro 14 having a rotor shaft 15, a disc 16 adjacent coil assembly 13 and secured to sleeve 11, and a diaphragm assembly indicated generally at 17 positioned within said sleeve 11 intermediate said synchro 14 and casing 12 by a plurality of shims 18. Diaphragm assembly 17 includes a diaphragm spring 19, a solenoid plunger 20, a wiper actuator 21 and a support member 22 for the actuator 21. Solenoid plunger 20 is provided with a central tapered aperture 23 within which a tapered insert 24 is operatively positioned, insert 24 being secured to synchro rotor shaft 15 by pin 25. Secured to said synchro 14 is a resistance support member 26 upon which is located a potentiometer resistance ring 27 and a pick-off ring 28. Secured to and rotatable with synchro shaft 15 is a wiper assembly 29 which includes a pair of wiper blades or arms 30 and 31, wiper blade 30 being adapted to contact the potentiometer resistance ring 27, while wiper blade 31 is adapted to cooperate with pick-off ring 28, as described in greater detail hereinafter. Electrical wiring for the rings 27 and 28 is indicated at 32, while wiring for solenoid 13 is indicated at 33.

As is readily seen from the drawings, the diaphragm spring 19 is employed to effect a circuit connection between rings 27 and 28 via the wiper blades 30 and 31 when the solenoid windings 13 are de-energized as illustrated in FIG. 1 due to the wiper actuator 21 bearing against the blades. Energization of the solenoid windings 13 draws solenoid plunger 20 toward casing 12 and is effective to overcome the bias force of diaphragm spring 19 to remove the positive pressure by actuator 21 on the blades 30 and 31 whereby the blades raise from contact with rings 27 and 28, as shown in FIG. 2, due to the construction thereof, thus breaking the circuit connection between the rings while allowing the synchro shaft 15 to rotate without frictional effects between the wiper blades and the rings, thus additionally eliminating element wear.

It has thus been shown that the invention provides a means to lift the potentiometer wiper when output voltages are not required, thereby eliminating the degrading effects of wiper friction and element wear.

Although a particular embodiment of the invention has been illustrated and described, modifications will become apparent to those skilled in the art, and it is intended to cover in the appended claims all such modifications as come within the true spirit and scope of the invention.

What we claim is:

1. A magnetically operated device for lifting the wiper from a potentiometric resistor element when output voltages are not required comprising: a housing, a solenoid assembly secured within said housing, a shaft rotatably mounted within said housing, a tapered member secured to said shaft for rotation therewith, a wiper assembly secured to said shaft and rotatable therewith, a resistance support member fixedly secured within said housing, a resistance member and a pick-off member being operatively positioned on said support member, a diaphragm assembly operatively secured within said housing and including a first portion having a tapered surface configured to frictionally engage said tapered member and a second portion adapted to bear against said wiper assembly under predetermined operating conditions, and electrical wiring for said solenoid assembly and said resistance and pick-off members.

2. The device defined in claim 1, wherein said wiper assembly includes a pair of wiper blades, one of said blades being adapted to cooperate with said resistance member, and the other of said blades being adapted to cooperate with said pick-off member.

3. The device defined in claim 1, wherein said resistance member and said pick-off member are each substantially circular in configuration, and wherein said pick-off member is of a smaller diameter than the diameter of said resistance member.

4. The device defined in claim 1, wherein said diaphragm assembly additionally includes a resilient diaphragm member operatively secured to said housing, and wherein said portion thereof which cooperates with said tapered member functions as a plunger member for said solenoid assembly.

5. The device defined in claim 1, wherein said shaft is operatively connected to a synchro for rotation thereby, and said synchro is fixedly secured within said housing.

6. The device defined in claim 1, wherein said solenoid assembly includes a casing positioned adjacent one end of said housing, and a coil assembly operatively secured in said casing, said casing and said coil assembly being configured to define a central cavity; wherein said resistance member and said pick-off member are each substantially circular in configuration and positioned within said housing in a spaced relationship with said solenoid assembly, wherein said wiper assembly includes at least a pair of blade members and is positioned intermediate said resistance support member and said solenoid assembly such that said wiper assembly blade members are adjacent said resistance and pick-off members; and wherein said diaphragm assembly is positioned intermediate said solenoid assembly and said resistance support member and includes a diaphragm spring, said configured portion thereof being movable in said central cavity of said solenoid assembly and functioning as a solenoid plunger, whereby during deactivation of said solenoid assembly said spring diaphragm maintains said wiper assembly bearing portion of said diaphragm assembly against said wiper assembly blade members such that at least one of said blade members is in contact with each of said resistance and pick-off members, and said configured portion of said diaphragm assembly cooperates with said tapered member so as to prevent rotation of said shaft; and upon activation of said solenoid assembly, said configured portion of said diaphragm assembly is drawn into said central cavity of said solenoid assembly which releases the holding pressure against said wiper assembly blade members and allows said tapered member to be rotated by said shaft, thereby reducing frictional effects between said blade members and said resistance and pick-off members during rotation of said shaft.

7. The device defined in claim 6, additionally including a sleeve positioned intermediate said housing and said solenoid casing and extending substantially the length of said housing, said shaft being drivingly connected to a synchro positioned within said sleeve, said diaphragm assembly additionally including a support member secured to said diaphragm spring and positioned within said sleeve and intermediate said casing of said solenoid assembly and said synchro, and shim means positioned between said synchro and said diaphragm assembly support member and between said diaphragm assembly support member and said solenoid casing.

8. The device defined in claim 7, additionally including a disc positioned adjacent said solenoid assembly coil assembly and secured within a flanged portion of said solenoid assembly casing, said shim means positioned intermediate said diaphragm assembly support member and said solenoid assembly casing securing said disc against said coil assembly.

References Cited
UNITED STATES PATENTS

| | | | |
|---|---|---|---|
| 2,541,852 | 2/1951 | Zimmer | 338—116 X |
| 2,730,596 | 1/1956 | McLaughlin | 338—116 |
| 2,913,694 | 11/1959 | Heselwood | 338—116 X |

ROBERT K. SCHAEFER, *Primary Examiner.*

H. J. HOHAUSER, *Assistant Examiner.*